US011757146B2

(12) United States Patent
Chauvin (10) Patent No.: US 11,757,146 B2
(45) Date of Patent: Sep. 12, 2023

(54) SYSTEM AND METHOD TO PRESERVE OPERATIONAL CONDITION OF BATTERY SYSTEM DURING COLD WEATHER AND POWER OUTAGES

(71) Applicant: Rivian IP Holdings, LLC, Plymouth, MI (US)

(72) Inventor: Curtis Wesley Chauvin, Orange, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 17/563,184

(22) Filed: Dec. 28, 2021

(65) Prior Publication Data
US 2023/0207921 A1  Jun. 29, 2023

(51) Int. Cl.
*H01M 10/635* (2014.01)
*H01M 10/48* (2006.01)
*H01M 10/625* (2014.01)
*H01M 10/615* (2014.01)

(52) U.S. Cl.
CPC ....... *H01M 10/635* (2015.04); *H01M 10/486* (2013.01); *H01M 10/615* (2015.04); *H01M 10/625* (2015.04); *H01M 2220/20* (2013.01)

(58) Field of Classification Search
CPC ............. H01M 10/635; H01M 10/615; H01M 10/625; H01M 10/486; H01M 2220/20
See application file for complete search history.

(56) References Cited

U.S. PATENT DOCUMENTS

| | | | |
|---|---|---|---|
| 2021/0231740 A1* | 7/2021 | Dubuque | G06Q 10/04 |
| 2022/0216728 A1* | 7/2022 | Ashman | G01R 22/063 |
| 2022/0344728 A1* | 10/2022 | Myneni | G06F 1/329 |

* cited by examiner

*Primary Examiner* — Victoria H Lynch
(74) *Attorney, Agent, or Firm* — Clements Bernard Walker; Christopher L. Bernard (57) ABSTRACT

Disclosed embodiments include systems, vehicles, and computer-implemented methods for maintaining the operational condition of a battery system incorporated in a vehicle or otherwise stored and, based on weather information, to adjust reserve capacity in the battery system prevent damage as a result of weather conditions. In an illustrative embodiment, a system includes a communications interface configured to communicate with a weather information source over a network to receive data on anticipated weather conditions; and a battery controller configured to interoperate with the communications interface and to control a reserve capacity level for a battery system, wherein the battery controller is configured to: determine whether the reserve capacity level is sufficient to maintain operational condition of the battery system under the anticipated weather conditions; and modify the reserve capacity level responsive to a determination that the reserve capacity level is sufficient to maintain the operational condition of the battery system.

19 Claims, 11 Drawing Sheets

SYSTEM AND METHOD TO PRESERVE OPERATIONAL CONDITION OF BATTERY SYSTEM DURING COLD WEATHER AND POWER OUTAGES

INTRODUCTION

A battery system may possibly become damaged and/or may at least partially lose its capacity to maintain a charge. For example, a battery system of a vehicle may get damaged and/or lose capacity if the vehicle is parked or stored at low temperatures and/or with the battery system at a low charge level.

SUMMARY

Disclosed embodiments include systems, vehicles, and computer-implemented methods for maintaining the operational condition of a battery system incorporated in a vehicle or otherwise stored and, based on weather forecast information, to adjust reserve capacity in the battery system prevent the battery system from incurring damage as a result of weather conditions. For example, vehicle owners or operators may be able to avoid potential damage to a vehicle battery system by maintaining a suitable charge level for the weather, such as by increasing the charge level when cold temperatures are expected or by moving the vehicle into a garage. However, when the vehicle is parked at a remote location, the vehicle owner or operator may not be able to keep the battery system sufficiently warm or may not be able to keep the battery system charged at a sufficient level to avoid damage or loss of battery capacity.

In an illustrative embodiment, a system includes an interface configured to communicate with a weather information source over a network to transfer (e.g., send and/or receive) data on one or more weather conditions; and a battery controller configured to communicate with the interface to control a capacity level for a battery system, wherein the battery controller is configured to: determine whether the reserve capacity level is sufficient to maintain operational condition of the battery system under the one or more weather conditions; and modify the reserve capacity level to maintain the operational condition of the battery system.

In another illustrative embodiment, a vehicle includes a battery system configured to provide power to the drive system; and a battery management system including: a communications interface configured to communicate with a weather information source over a network to receive data on anticipated weather conditions; and a battery controller configured to interoperate with the communications interface and to control a reserve capacity level for a battery system, wherein the battery controller is configured to: determine whether the reserve capacity level is sufficient to maintain operational condition of the battery system under the anticipated weather conditions; and modify the reserve capacity level sufficient to maintain the operational condition of the battery system responsive to a determination that the reserve capacity level is sufficient to maintain the operational condition of the battery system under the anticipated weather conditions.

In another illustrative embodiment, a computer implemented method includes: recognizing a reserve capacity level for a battery system; receiving data on anticipated weather conditions; determining whether the reserve capacity level is sufficient to maintain the battery system in operational condition under the anticipated weather conditions; and modifying the reserve capacity level to maintain the operational condition of the battery system responsive to a determination that the reserve capacity level is insufficient to maintain the battery system in operational condition under the anticipated weather conditions.

Further features, advantages, and areas of applicability will become apparent from the description provided herein. It will be appreciated that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings:

FIGS. 2A-5B are block diagrams of the battery management system of FIG. 1;

DETAILED DESCRIPTION

The following description explains, by way of illustration only and not of limitation, various embodiments. By way of a non-limiting introduction and overview, in various embodiments, a system includes a communications interface configured to communicate with a weather information source over a network to transfer data on anticipated weather conditions; and a battery controller configured to interoperate with the communications interface and to control a reserve capacity level for a battery system, wherein the battery controller is configured to: determine whether the reserve capacity level is sufficient to maintain operational condition of the battery system under the anticipated weather conditions; and modify the reserve capacity level to maintain the operational condition of the battery system responsive to a determination that the reserve capacity level is insufficient to maintain the operational condition of the battery system under the anticipated weather conditions.

Now that a general overview has been given, details of various embodiments will be explained by way of non-limiting examples given by way of illustration only and not of limitation.

Figure 1:
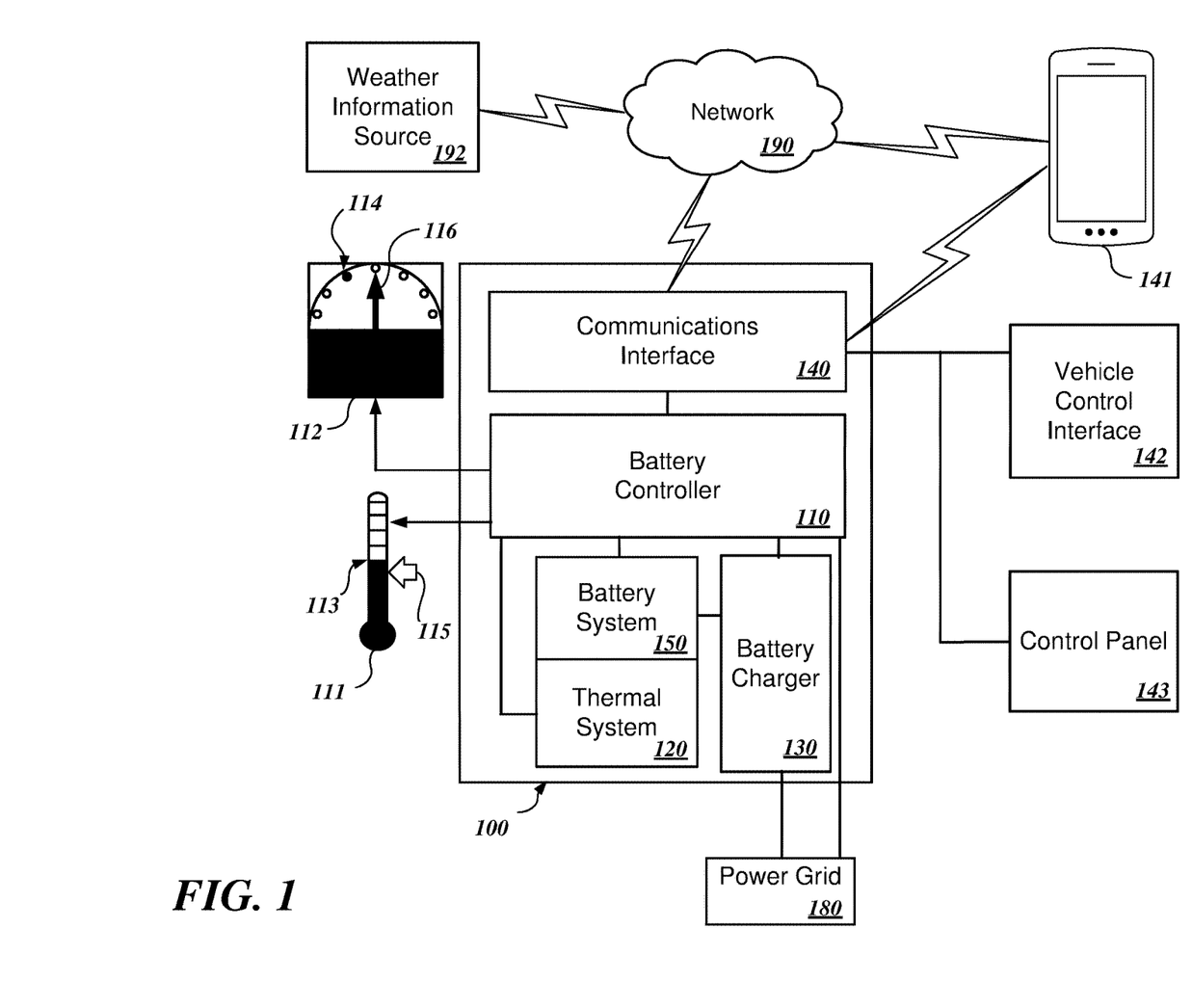
FIG. 1 is a block diagram of a battery management system for preserving the operational condition of a battery system.

Referring to FIG. 1, an illustrative battery management system 100 is operably coupled with a battery system 150 of a vehicle (not shown in FIG. 1). The battery management system 100 includes a battery controller 110 operably coupled with the battery system 150 and a communications interface 140. The battery management system 100 also includes a thermal system 120 in thermal communication with the battery system 150 and a battery charger 130 that is electrically coupled with the battery system 150. The battery controller 110 is communicatively coupled with the thermal system 120 and the battery charger 130 to communicate and/or interoperate with the thermal system 120 and the battery charge 130.

In various embodiments, the battery controller 110 is configured to monitor the condition of the battery system 150 and selectively communicate with and/or interoperate with the other systems 120, 130, and 140 in order to maintain the operational condition of the battery system 150. The battery controller 110 includes a thermal sensor 111 (symbolically represented as a thermometer in FIGS. 1-5B) and a charge sensor 112 (symbolically represented as a gauge in FIGS. 1-5B) to monitor a temperature 113 and a charge level 116, respectively, of the battery system 150. In various embodiments, a reserve capacity level 114 (symbolically represented by a solid dot on the gauge representing the charge sensor 112) may be set. In various embodiments, the reserve capacity level 114 is a predetermined reserve capacity level of the battery system 150 that will maintain the operational capacity of the battery system 150 and prevent the battery system 150 from incurring damage from being stored at an insufficient charge level under ordinary temperature conditions. For example, however, the predetermined reserve capacity level 114 may need to be changed to prevent damage to the battery system 150 when the battery system 150 is stored at low temperatures. It will be appreciated that the battery system 150 may not necessarily incur damage from being stored at low temperatures and/or being stored at the low temperatures for a limited duration. Nonetheless, in various embodiments, the battery management system 100 is configured to prevent possible damage to the battery system 150 from being stored at a charge level that is insufficient to protect the battery system 150 from incurring damage. In various embodiments, the battery controller 110 is configured to adjust the reserve capacity level 114 in response to the temperature 113 of the battery system 150 measured by the thermal sensor 111. It will be appreciated that, if the battery system 150 is to be stored at a higher than expected temperature, the reserve capacity level 114 may be reduced without exposing the battery system 150 to risk of damage.

In various embodiments, the battery controller 110 is configured to engage the thermal system 120 to heat the battery system 150 as needed to prevent the temperature 113 from slipping below a threshold temperature where the battery system 150 may incur damage. The thermal system 120 may include a thermoelectric heating device. In various embodiments, the battery controller 110 is configured to selectively direct electric power from the battery system 150, the battery charger 130, or a power grid 180 to selectively power the thermal system 120 to heat the battery system 150. A minimum temperature setting 115 (represented symbolically by an arrow positioned against the thermometer representing the thermal sensor 111) may be set so that when the temperature falls to or below the minimum temperature setting 115, the battery controller 110 activates the thermal system 120 to heat the battery system 150 until the temperature 113 of the battery system 150 is restored to the minimum temperature setting 115.

In various embodiments, the battery controller 110 is configured to activate the battery charger 130, which is coupled to the power grid 180, to charge the battery system 150. In various embodiments, when the charge sensor 112 indicates that the charge level 116 is below the reserve capacity level 114, the battery controller 110 activates the battery charger 130 to charge the battery system 150 until the charge level 116 of the battery system 150 is restored to the reserve capacity level 114.

As previously mentioned, the battery system 150 may possibly incur damage if the battery system 150 is stored or otherwise kept below a certain temperature and/or is stored with a charge level below a certain threshold that is suitable or sufficient for a particular temperature. The battery controller 110 thus may be used to manage the temperature 113 and/or the charge level 116 of the battery system 150 to maintain the operational condition of the battery system 150. Cold weather or severe weather that can blackout the power grid 180 could interfere with or prevent the battery controller 110 from maintaining operational condition of the battery system 150. Thus, the battery controller 110 may be configured to preemptively employ measures to heat and/or charge the battery system 150 to maintain its operational condition, as described further below.

In various embodiments, the communications interface 140 enables the battery controller 110 to seek, send, and/or receive data that may be used to direct the heating and/or charging of the battery system 150. As described further below with reference to FIGS. 2A and 2B, the communications interface 140 may be configured to communicate directly via a computing device 141, a vehicle control interface 142, or another control panel 143 that is coupled to or couplable with the communications interface 140 via a wired or wireless interface. In various embodiments, the vehicle control interface 144 and the control panel 146 may be directly coupled with the battery management system 100.

The communications interface 140 may communicate directly with the computing device 141 via Wi-Fi, Bluetooth, near field communications, or some other direct communications protocol. The communications interface 140 also may communicate with the computing device 141 or other systems via a network 190, such as a Wi-Fi, cellular, satellite, or other network. Thus, the communications interface 140 enables an operator to communicate with the battery management system 100 either locally or from a remote distance.

The communications interface 140 also enables the battery controller 110 to transfer information with a weather information source 192, such as by seeking and/or receiving information from the weather information source 192 regarding impending weather conditions that could affect the battery system 150. Using the weather information, the battery controller 110 can take preemptive measures to preserve the operating condition of the battery system 150 as described further below. In various embodiments, the communications interface 140 also enables the battery controller 110 to send alerts to the computing device 141 to alert the operator of that status of the battery system 150 and/or of weather conditions or other issues that may affect the ability of the battery controller 110 to preserve the operating condition of the battery system 150. In various embodiments, the communications interface 140 also may transfer information to the weather source 192, such as by sending data to communicate a temperature (which may vary from a temperature reported by the weather information source 192) or to communicate that a power failure has occurred.

Figure 2A:
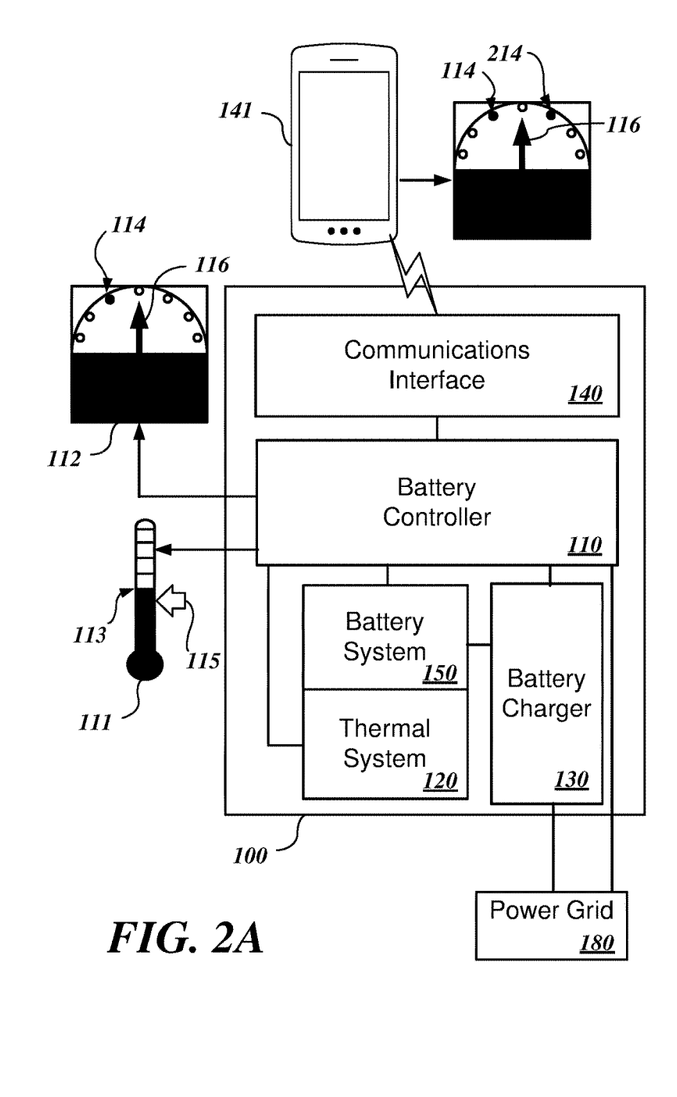

Referring additionally to FIG. 2A, the communications interface 140 enables an operator to set or change the reserve capacity level 114 of the battery system 150. In various embodiments, the reserve capacity level 114 may be changed using the computing device 141, which may include a smartphone, computer, or a similar device, or with the vehicle control interface 142 or the control panel 143 of the battery management system 100. The operator may wish to set or change the reserve capacity level 114 of the battery system 150 to maintain the operational condition of the battery system 150 or to ensure that the battery system 150 maintains a desired minimum charge to enable the vehicle to be driven a minimum distance that is supported by the desired minimum charge. As previously described, the computing device 141 may communicate with the battery controller 110 via the communications interface 140 either directly or over the network 190.

Using the computing device 141, the operator is able to review the current reserve capacity level 114 set for the battery system 150 and the current charge level 116 of the battery system 150. When desired, the operator may select a new reserve capacity level 215 via an interface presented by the computing device 141. According to various embodiments, the operator may receive the same information and/or make changes using the other interfaces 142 and 143.

Figure 2B:
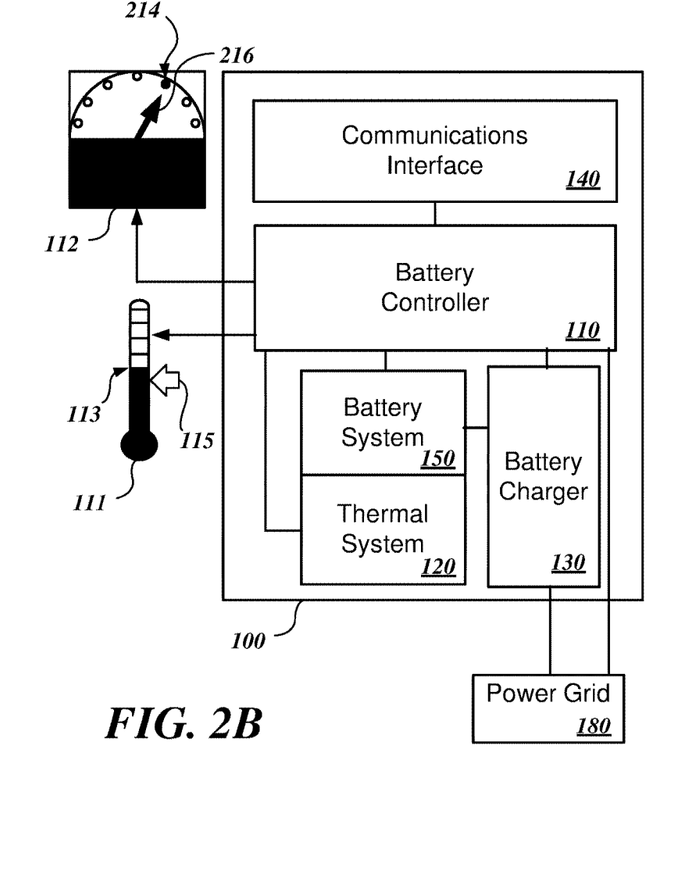

Referring additionally to FIG. 2B, the new reserve capacity level 214 is set at the battery controller 110. Because the new reserve capacity level 214 is higher than the charge level 116 of the battery system 150, the battery controller 110 activates the battery charger 130 to charge the battery system 150 until a new charge level 216 reaches the new reserve capacity level 214. The operator may choose to manually change the reserve capacity level 114 so that the vehicle will be able travel a greater distance based on the new charge level 216, because the operator is concerned about anticipated weather conditions affecting the ability to charge the battery system 150, or other reasons.

Thus, the reserve capacity level 114 may include either a predetermined reserve capacity level or an operator-specified reserve capacity level 214. For example, a first operator/driver may reserve a higher or lower capacity level 214 than a second operator/driver based on the first operator/driver's preferences to have more reserves. In some instances, the first operator/driver may prefer more reserves for various terrains, e.g., uphill, off-road, dirt, sand, etc. As described further below, the battery controller 110 may change the reserve capacity level that was set to maintain the operational condition of the battery system 150 when the battery system 150 is stored under adverse weather conditions. The capacity level 214 also may be modified to account for a distance to a charging location. For example, an operator that commutes to a nearby workplace with a charging facility may choose to modify the capacity level 214 to a lower level because the operator plans to charge the battery system at the workplace.

Figure 3A:
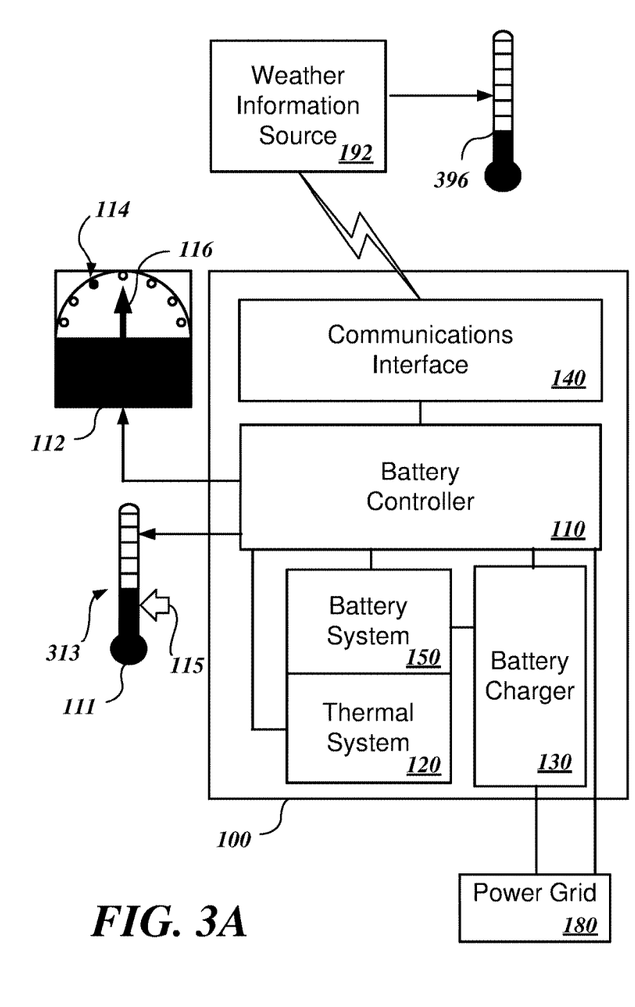

Referring additionally to FIG. 3A, the battery controller 110 receives information via the communications interface 140 about anticipated or forecasted weather conditions that may affect the battery system 150. For example, the weather information source 192 predicts a cold temperature 396 that is below both a current temperature 313 and the current temperature setting 115 of the battery system 150. In various embodiments, the communications interface 140 may be configured to periodically query the weather information source 192 to check impending weather conditions for a predetermined interval beyond a current time and date. In various embodiments, the communications interface 140 may be configured to receive "push" notifications from the weather information source 192 that may be configured to send such notifications when temperatures are anticipated to fall below a certain level or when severe weather that may blackout the power grid 180 is anticipated. The weather information source 192 may include national, state, city, and/or municipal weather information, potentially based on travelling through such geographic areas, among other possibilities. Further, weather information sources 192 may include information or data from independent system operators that manage electricity in the grid amongst one or more states and/or geographic areas in neighboring countries.

Figure 3B:
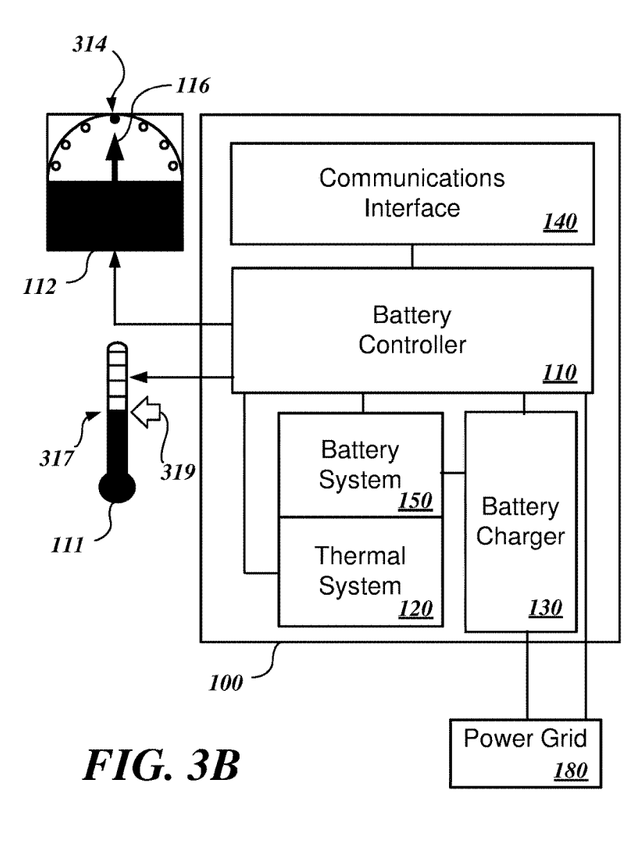

Referring additionally to FIG. 3B, to preserve the operational condition of the battery system 150, the battery controller 110 may initiate one or more actions. In various embodiments, the battery controller 110 sets a new temperature setting 319 that is higher than the current temperature setting 115 and the current temperature 113 of the battery system 150. As a result of the current temperature setting 115 surpassing the current temperature 113 of the battery system 150, the thermal system 120 will be activated to heat the battery system 150 until a new temperature 317 of the battery system 140 reaches the new temperature setting 319. Heating the battery to the new temperature 317 may help ensure that the battery system 150 is maintained at a temperature that avoids damage that could result if the temperature of the battery system 150 were to fall as a result of exposure to the predicted cold temperature 396.

In addition to or instead of heating the battery system 150, the operational condition of the battery system may be preserved by increasing the reserve capacity level 114 of the battery system 150 to a higher reserve capacity level 314 at which the cold temperature 396 will not cause damage to the battery system 150. The battery charger 130 will charge the battery system 150 as needed until the charge level reaches the higher capacity level 314. In the example of FIG. 3B, the charge level 116 matches the higher reserve capacity level 314, thus, the battery charger 130 is not activated to further charge the battery system 150. However, if the charge level 116 were to slip below the higher reserve capacity level 314, the battery charger 130 would be activated until the charge level 116 reaches the higher reserve capacity level 314. By increasing the temperature 317 and/or the charge level 116 of the battery system 150, the cold temperature 396 may be prevented from affecting the operational condition of the battery system 150.

Figure 4A:
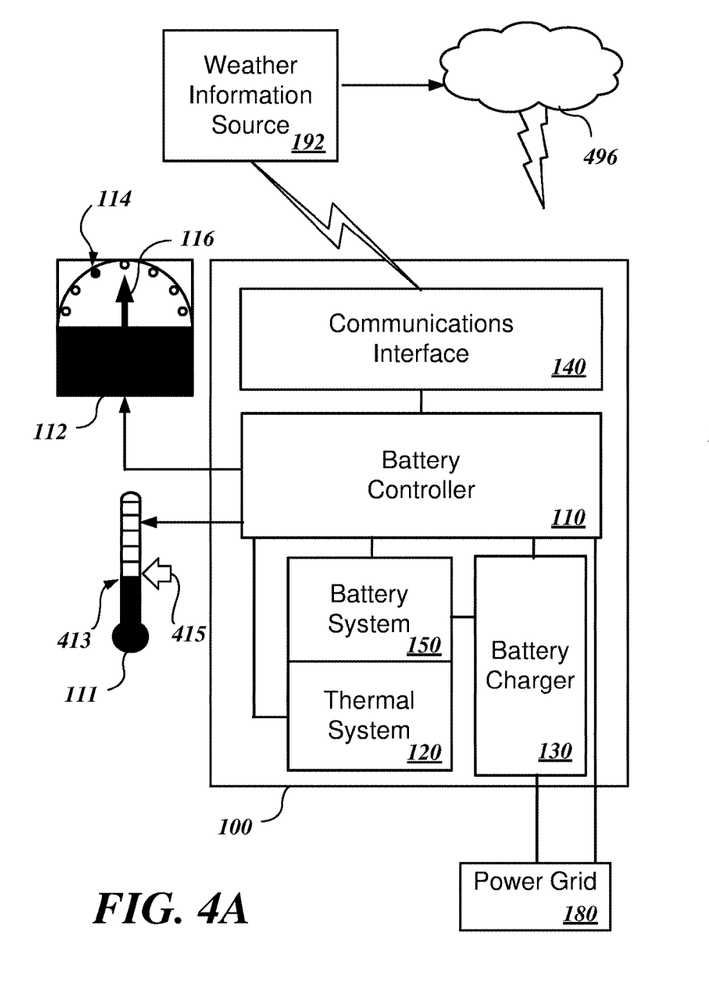

Referring additionally to FIG. 4A, the battery controller 110 receives information via the communications interface 140 about anticipated severe weather 496, such as thunderstorms, heavy rain, high winds, flooding, heavy snow, or other weather conditions that could blackout the power grid 180 for some period of time.

Figure 4B:
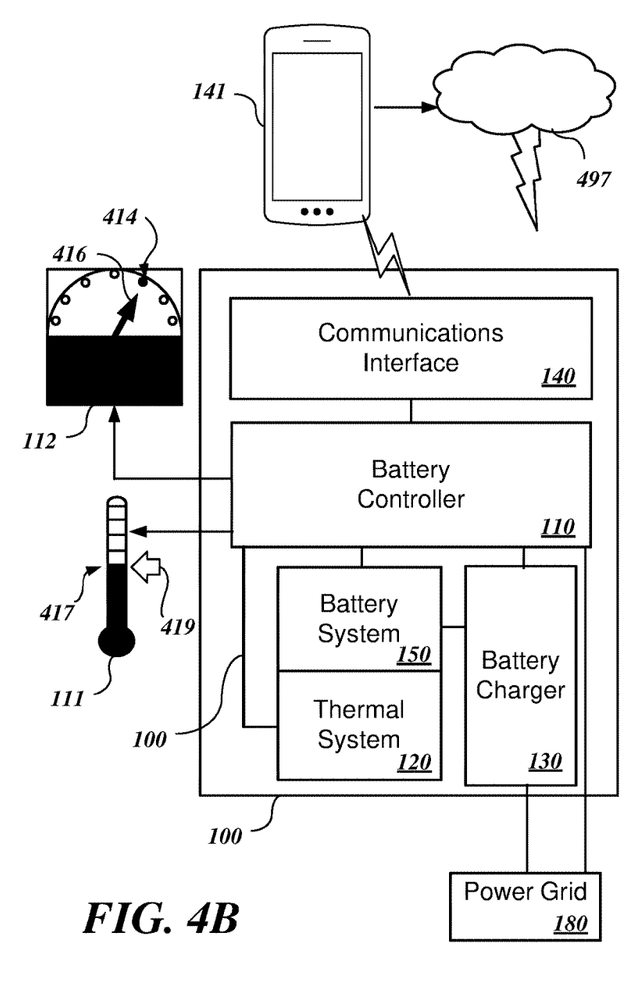

Referring additionally to FIG. 4B, because of the risk of that the power grid 180 may go out for an indeterminate period of time, the battery controller 110 sets a new temperature setting 419 that is higher than the current temperature setting 415 and the current temperature 413 of the battery system 150. The thermal system 120 is activated to heat the battery system 150 until a temperature level 417 of the battery reaches the new temperature setting 419. In addition, a higher reserve capacity level 414 is set and the battery charger 130 is activated to charge the battery system 150 until a new charge level 416 of the battery system 150 reaches the new reserve capacity level 414.

If the power grid 180 is blacked out and the battery system 150 cannot be charged and/or the temperature 417 drops, because the temperature 417 and the charge level 416 of the battery system 150 have been increased, the battery system 150 may be better situated to withstand the blackout of the power grid. The increased temperature setting 419 and the increased reserve capacity level 414 may include predetermined levels to be applied in the event of severe weather 496 that could blackout the power grid 180.

In various embodiments, the battery controller 110 may cause the communications interface 140 to transmit an alert 497 to the computing device 141 or another interface to alert the operator of the forecasted severe weather 496. The alert 497 may allow the operator to decide whether to take additional action, such as my further changing the temperature setting 419 or the reserve capacity level 414. As previously described with reference to FIGS. 2A and 2B, in various embodiments the battery management system 100 can enable the operator to use the computing device 110 or another interface to query the status of the battery system 150 to check the reserve capacity level 414, the charge level 416, the temperature setting 419, and/or the temperature of the battery system 150.

Figure 5A:
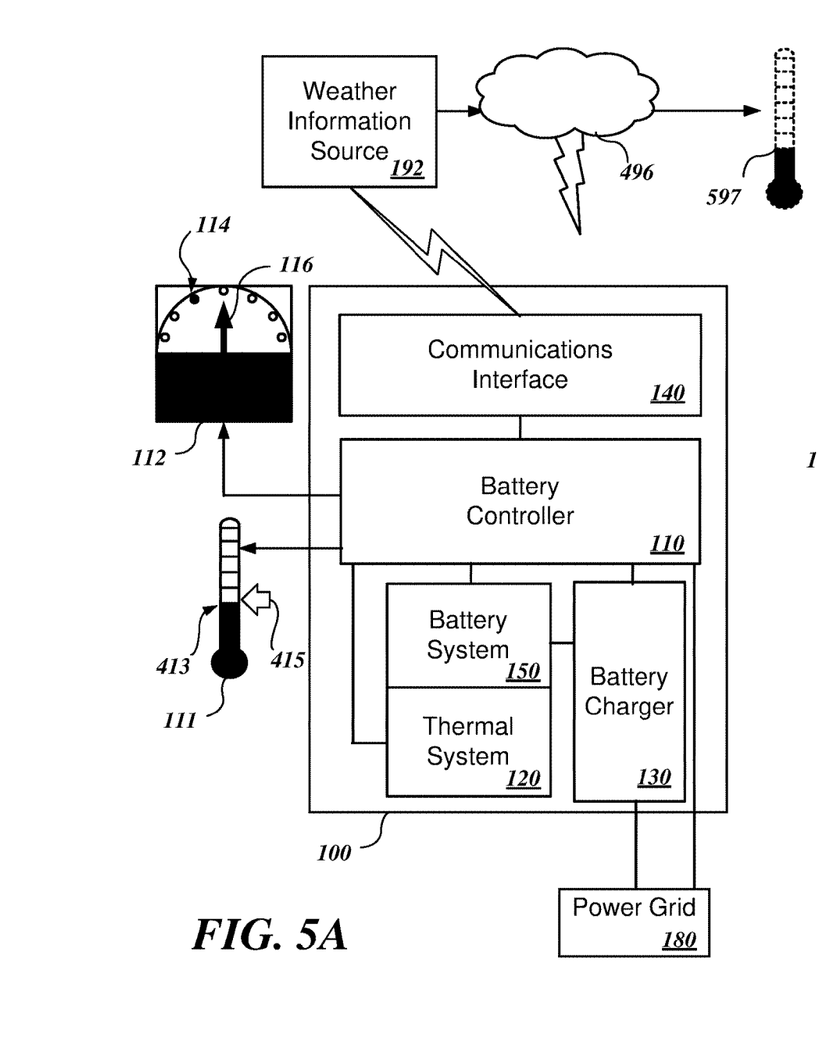

Referring additionally to FIG. 5A, similar to the example of FIG. 4A, the battery controller 110 receives information via the communications interface 140 about anticipated severe weather 496.

Figure 5B:
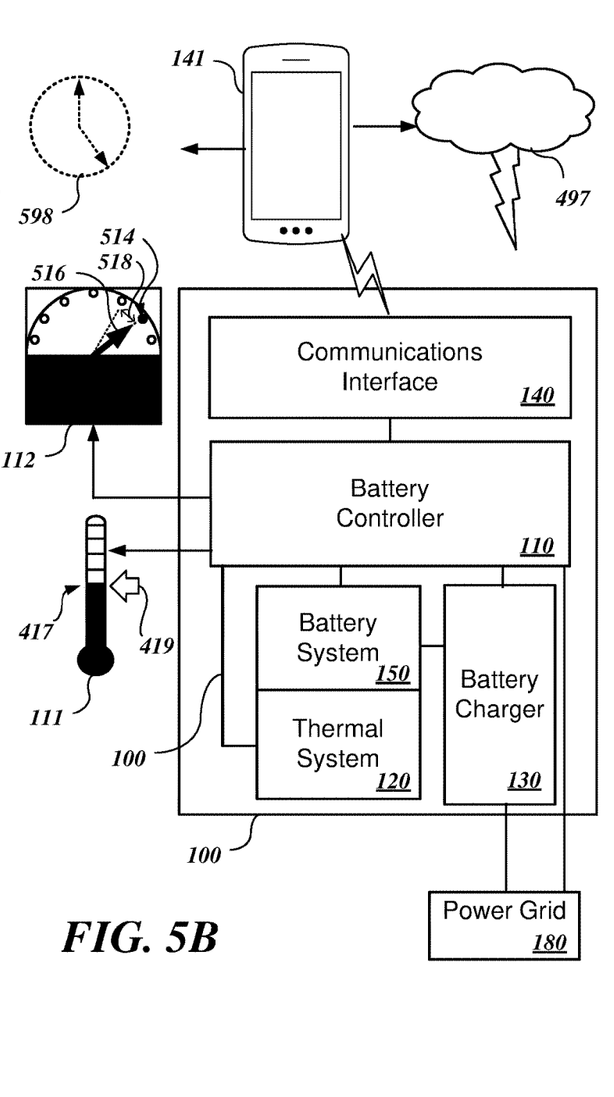

Referring additionally to FIG. 5B, instead of presently heating the battery system 150, as in the example of FIG. 4B, in various embodiments, the battery controller 110 raises the reserve capacity level 114 to a new reserve capacity level 514 to include a heating charge reserve 518. The heating charge reserve 518 is an amount of extra charge that is intended to be used by the battery system 150 to power the thermal system 120 to heat the battery system 150 at a later time. The heating charge reserve 518 is represented as a difference between the new reserve capacity level 514 of FIG. 5B and the new reserve capacity level 414 of FIG. 4B. Thus, if a blackout of the power grid 180 occurs for a prolonged time, the thermal system 120 may be operated using the heating charge reserve 518 to maintain the temperature 417 of the battery system 150. The battery charger 130 thus will charge the battery system 150 until the charge level 516 reaches the new reserve capacity level 514 including the heating charge reserve 518.

Whether a heating charge reserve 518 is applied to the battery system 150 may depend on whether the severe weather 496 is accompanied a forecasted low temperature 597 and/or whether a duration 598 of the severe weather 496 are anticipated to be of a prolonged duration. In various embodiments, the forecasted low temperature 597 and/or the duration 598 of the severe weather 496 and its effects also may be used to determine whether to increase the reserve capacity level 114 of the battery system 150 and by how much as well as to whether to increase the temperature level 415 and by how much. The forecasted low temperature 597 and the duration 598 of the severe weather and its affects, along with the warning of the severe weather 496, may be communicated to the computing device 141 to inform the operator and/or to allow the operator to decide whether to take additional action.

In various embodiments, the battery management system 100 may integrated into a vehicle such as a car, truck, sport utility vehicle, van, or recreational vehicle. In various embodiments, the vehicle also may include a motorcycle, all-terrain vehicle, or an electrically-powered moped or bicycle. In various embodiments, the vehicle also may include a marine vessel (such as a boat or a ship). In various embodiments, the vehicle also may include an aircraft (such as fixed-wing aircraft, rotary wing aircraft, and lighter-than-air craft).

Figure 6:
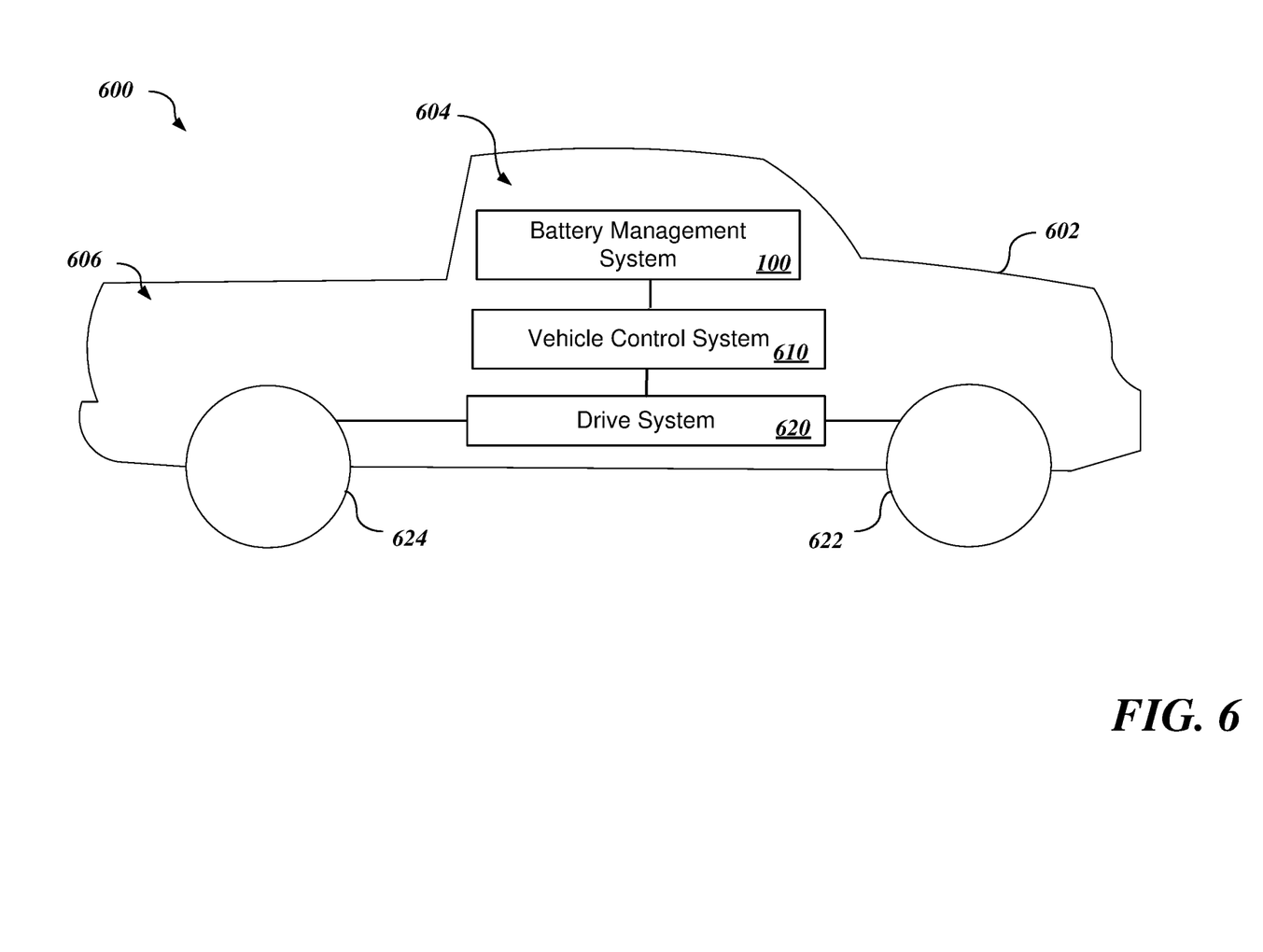
FIG. 6 is a block diagram in partial schematic form of an illustrative vehicle that includes the system of FIGS. 1-5B.

Referring additionally to FIG. 6, in various embodiments a vehicle 600 includes a battery management system 100 as herein described. In various embodiments, the vehicle 600 includes a body 602 that may include a cabin 604 capable of accommodating an operator, one or more passengers, and/or cargo and a cargo area 606 separate from the cabin 606, such as a trunk or a truck bed, capable of transporting cargo. The battery management system 100 may be accessible from the cabin 604 via the vehicle control interface 142 (FIG. 1) in communication with a vehicle control system 610 that controls various functions of the vehicle 600 and/or via the control panel 143 (FIG. 1) of the battery management system 100. The vehicle 600 includes a drive system 620, as further described below, which is selectively engageable with one or more front wheels 622 and/or one or more rear wheels 624 to motivate, accelerate, decelerate, stop, and steer the vehicle 600.

Figure 7:
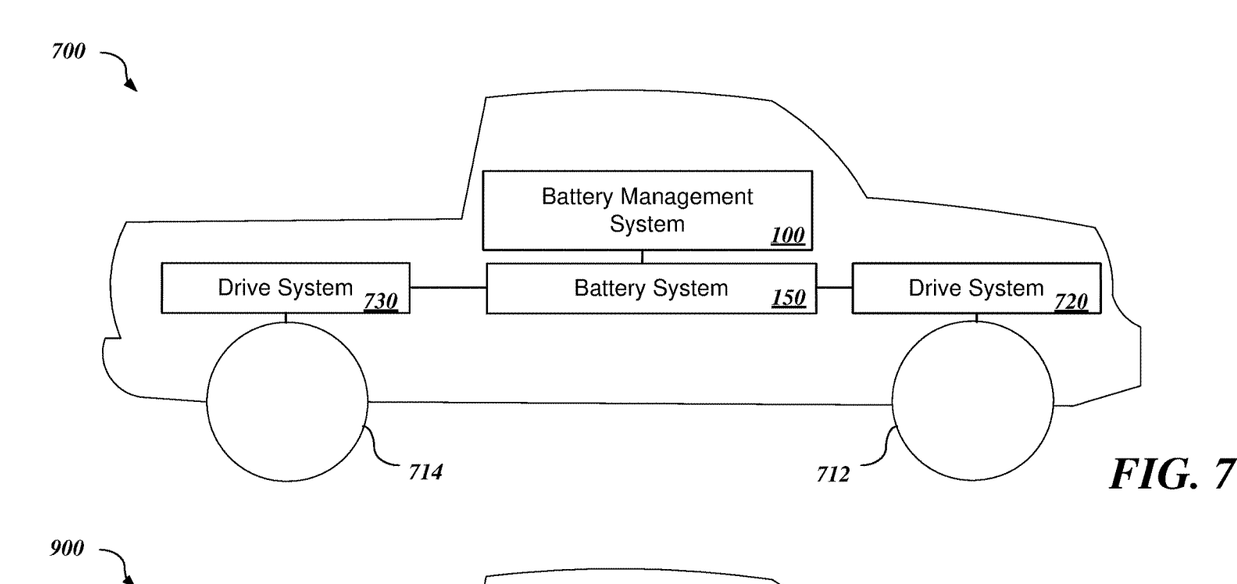
FIGS. 7 and 8 are block diagrams in partial schematic form of an electrically-powered vehicle and an internal combustion engine-powered vehicle, respectively, that may be equipped with the system of FIGS. 1-5B.

Referring additionally to FIG. 7, in various embodiments the battery management system 100 may be used with an electrically-powered vehicle 700. The wheels 712 and/or 714 may be motivated by one or more electrically-powered drive systems 720 and/or 730, such as motors, operably coupled with the wheels 712 and/or 714. The drive systems 720 and 730 draw power from the battery system, which also may be used to power the battery management system 100.

Figure 8:
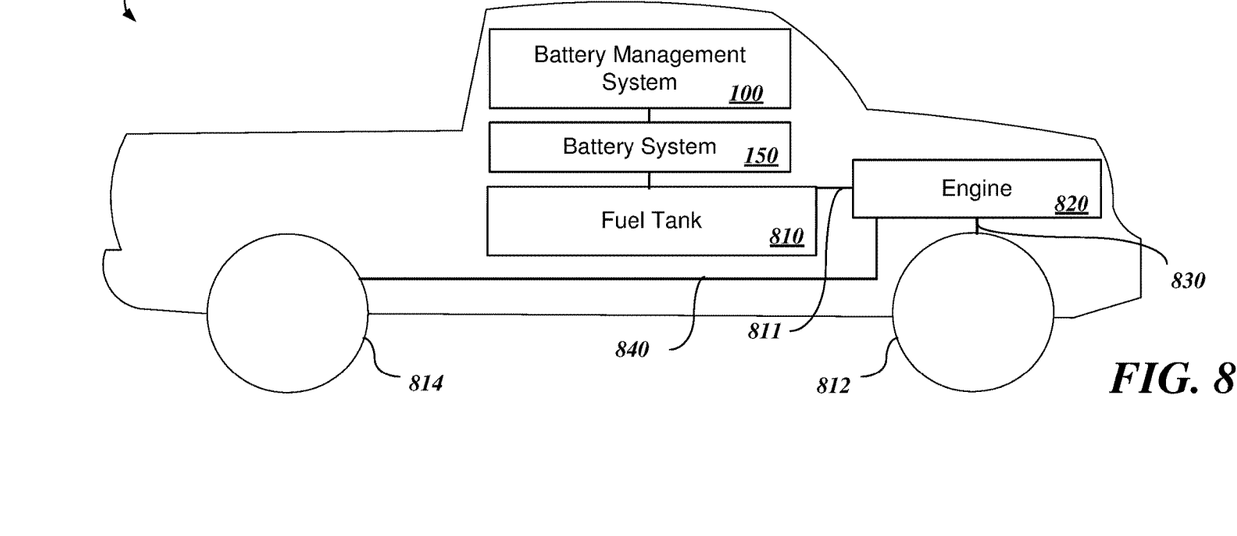

Referring additionally to FIG. 8, in various embodiments the battery management system 100 may be used with an internal combustion engine-powered vehicle 800 to manage a battery system used to power an ignition system of an engine 820 and other systems. The wheels 812 and/or 814 may be motivated by an internal combustion or hybrid engine 820 coupled with a fuel tank 810 via a fuel line 811. The engine 820 may be coupled to the wheels 812 and/or 814 by mechanical linkages 830 and 840, respectively, including axles, transaxles, or other drive train systems to provide rotational force to power the wheels 812 and/or 814. It will be appreciated that FIGS. 6-8 show four-wheeled land vehicles. However, as previously mentioned, it will be appreciated that the battery management system 100 may be integrated with other land vehicles, aircraft, or marine craft.

Figure 9:
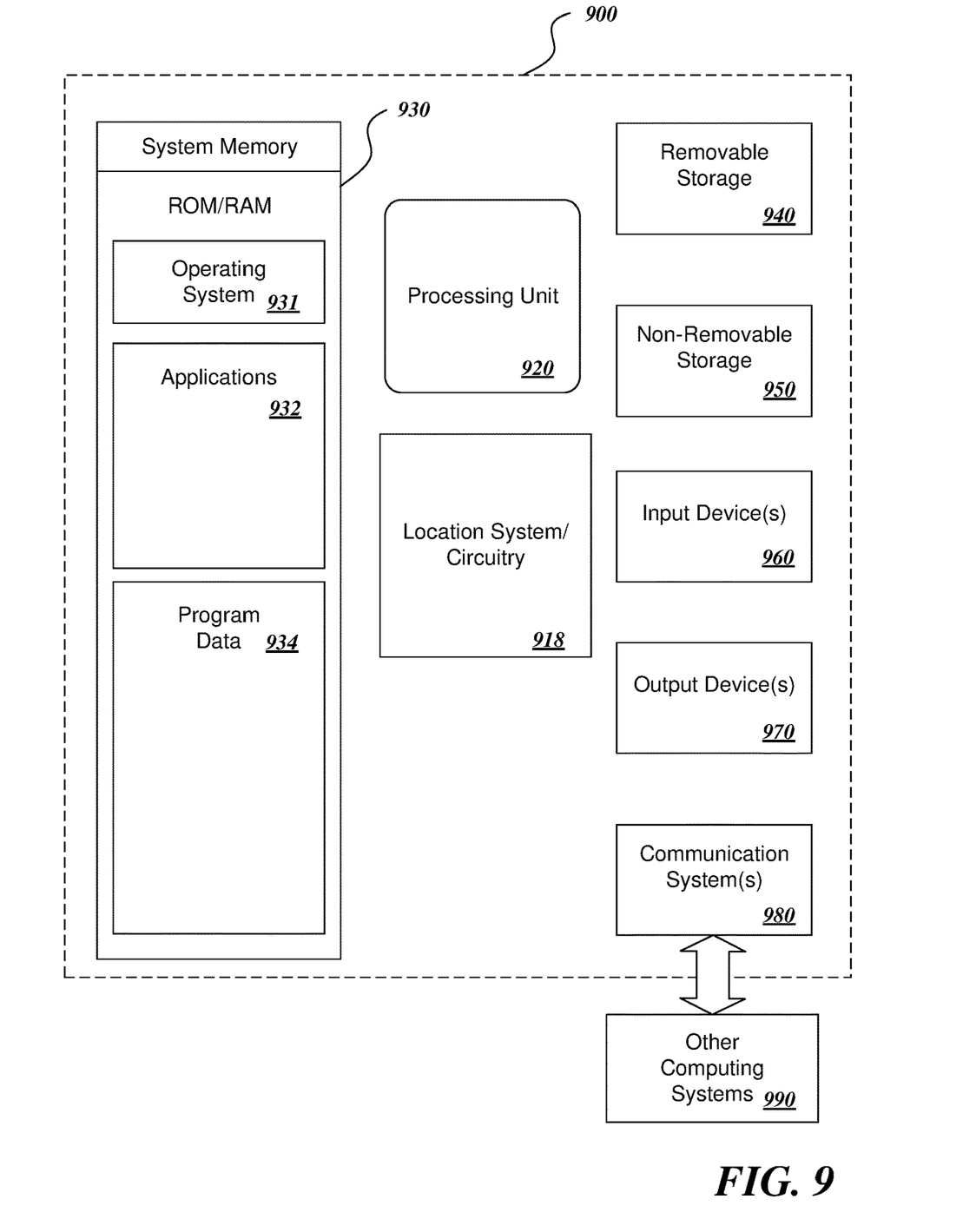
FIG. 9 is a block diagram of an illustrative computing system for performing functions of the system of FIGS. 1-5B.

Referring additionally to FIG. 9 and given by way of example only and not of limitation, the battery controller 110 and/or other elements of the battery management system 100 may include a general purpose computing device 900 configured to operate according to computer-executable instructions for preserving the operational condition of the battery system 150 as previously described. The computing device 900 typically includes at least one processing unit 920 and a system memory 930. Depending on the configuration and type of computing device, the system memory 930 may include volatile memory, such as random-access memory ("RAM"), non-volatile memory, such as read-only memory ("ROM"), flash memory, and the like, or a combination of volatile memory and non-volatile memory. The system memory 930 typically maintains an operating system 931, one or more applications 932, and program data 934. The operating system 931 may include any number of operating systems executable on desktop or portable devices including, but not limited to, Linux, Microsoft Windows®, Apple iOS®, or Android®, or a proprietary operating system. The applications 932 may include instructions to monitor the operational condition of the battery system 150, heat the battery system 150, charge the battery system 150, communicate via the communications interface 140 or perform other functions as herein described. The program data 934 may include temperature levels and charge levels that may be used to maintain the operational condition of the battery system 150 in response to cold or severe weather.

The computing device 900 may also have additional features or functionality. For example, the computing device 900 may also include additional data storage devices (removable and/or non-removable) such as, for example, magnetic disks, optical disks, tape, or flash memory. Such additional storage devices are illustrated in FIG. 9 by removable storage 940 and non-removable storage 950. Computer storage media may include volatile and nonvolatile, removable and non-removable media implemented in any method or technology for storage of information, such as computer-readable instructions, data structures, program modules or other data. The system memory 930, the removable storage 940, and the non-removable storage 950 are all examples of computer storage media. Available types of computer storage media include, but are not limited to, RAM, ROM, EEPROM, flash memory (in both removable and non-removable forms) or other memory technology, CD-ROM, digital versatile disks (DVD) or other optical storage, magnetic cassettes, magnetic disk storage or other magnetic storage devices, or any other medium which can be used to store the desired information and which can be accessed by the computing device 900. Any such computer storage media may be part of the computing device 900.

The computing device 900 may also have input device(s) 960 such as a keyboard, stylus, voice input device, touchscreen input device, etc. Output device(s) 970 such as a display, speakers, short-range transceivers such as a Bluetooth transceiver, etc., may also be included. The computing device 900 also may include one or more communication systems 980 that allow the computing device 900 to communicate with the network 190 (FIG. 1) other computing systems 990, such as the computing device 141, the weather information source 192, or other systems. As previously mentioned, the communication system 980 may include systems for wired or wireless communications. Available forms of communication media typically carry computer-readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of illustrative example only and not of limitation, communications media may include wired media such as a wired network or direct-wired connection, and wireless media such as acoustic, radio frequency (RF), infrared and other wireless media. The term computer-readable media as used herein includes both storage media and communication media.

In further reference to FIG. 9, the computing device 900 may include the location system/circuitry 918, which may include global positioning system ("GPS") and/or geolocation circuitry that can automatically discern its location based on relative positions to multiple GPS satellites or other signal sources, such as cellphone towers or other signal sources. The location system/circuitry 918 may be used to determine a location of the battery management system 100, for example, to be able to retrieve relevant weather data for the current location.

Figure 10:
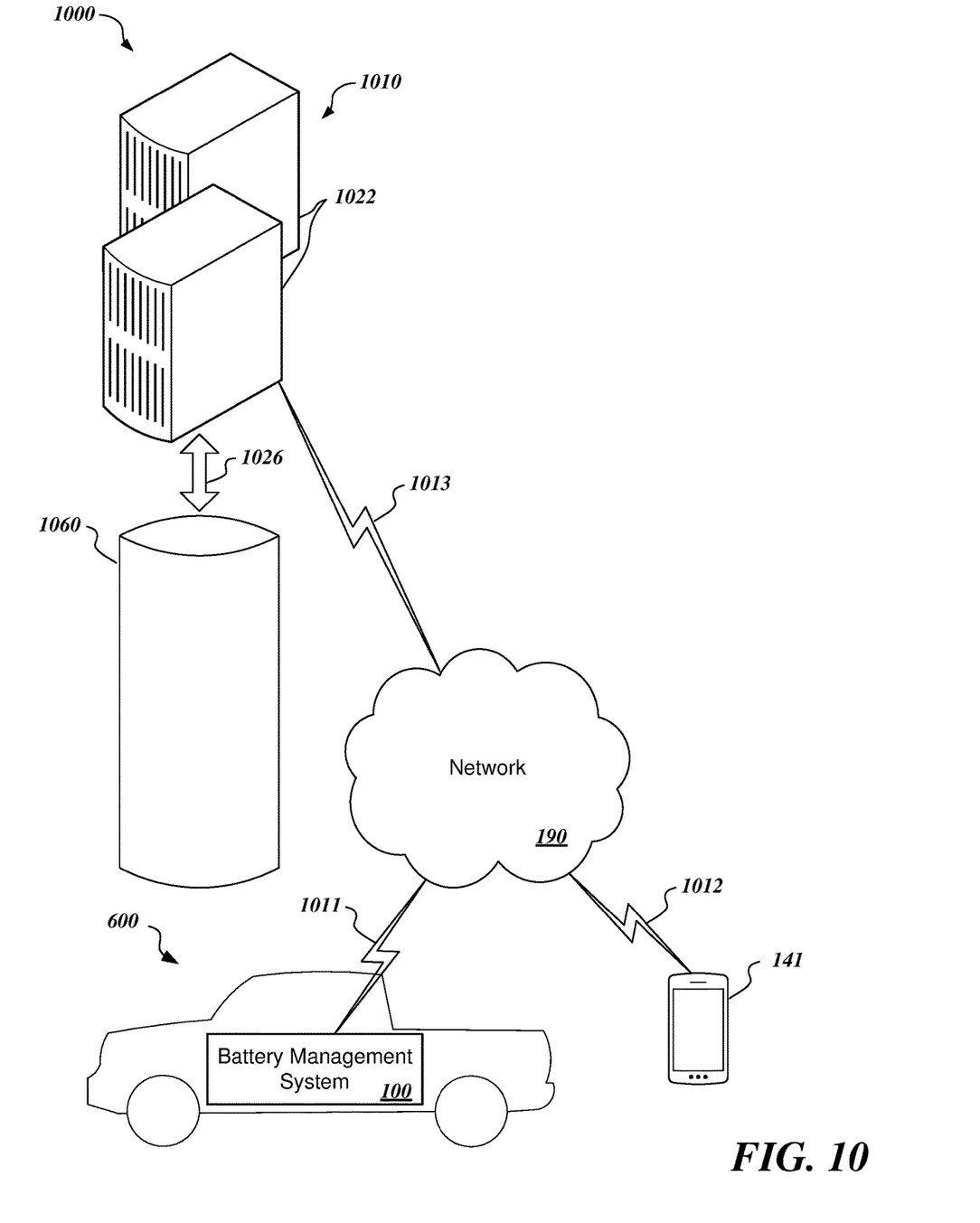
FIG. 10 is a block diagram of one or more illustrative systems of FIGS. 1-5B communicating with one or more remote systems.

In addition to one or more onboard computing systems, various embodiments may communicate with remote computing systems to perform the functions herein described. Referring additionally to FIG. 10, an operating environment 1000 may include one or more sets of remote computing systems 1010. It will be appreciated that the remote computing system 1010 may include one or more computing devices 1022 that may reside at one or more locations. In various embodiments, the remote computing systems 1010 each may include a server or server farm. The remote computing system 1010 may be used to provide weather information or software to the battery management system 100. Data or programs may be stored in high-speed storage 1030 accessible by the remote computing systems 1010 over a high-speed bus 1026.

In various embodiments, the remote computing systems 1010 communicate with the network 190 over wired and/or wireless communications links 1013. The battery management system 100 may be integrated with or transportable aboard a vehicle, such as the vehicle 600 (FIG. 6). The battery management system 100 may communicate over the network 190 via communications links 1011 to access the remote computing systems 1010 to retrieve or store data from the data storage 1030. The communications links 1011 may include wireless communications links to enable mobile communications with the battery management system 100 or may include a wired links to be used, for example, when the vehicle 600 includes an electric vehicle that is stopped and/or plugged in for charging.

The battery management system 100 also may be supported or accessed by the computing system 141, as previously described, that is not integrated with the vehicle 600. The computing system 141 may include a portable computing system, such as a portable computer, tablet computer, smartphone, or smartwatch. The computing system 141 may communicate over the network 190 via a communications link 1012 to access the remote computing systems 1010 or the battery management system 100 to monitor the state of the battery system 150 and/or make changes to the setting so of the battery management system 100 as previously described. The communications link 1012 may include a wireless or a wired communications link.

Figure 11:
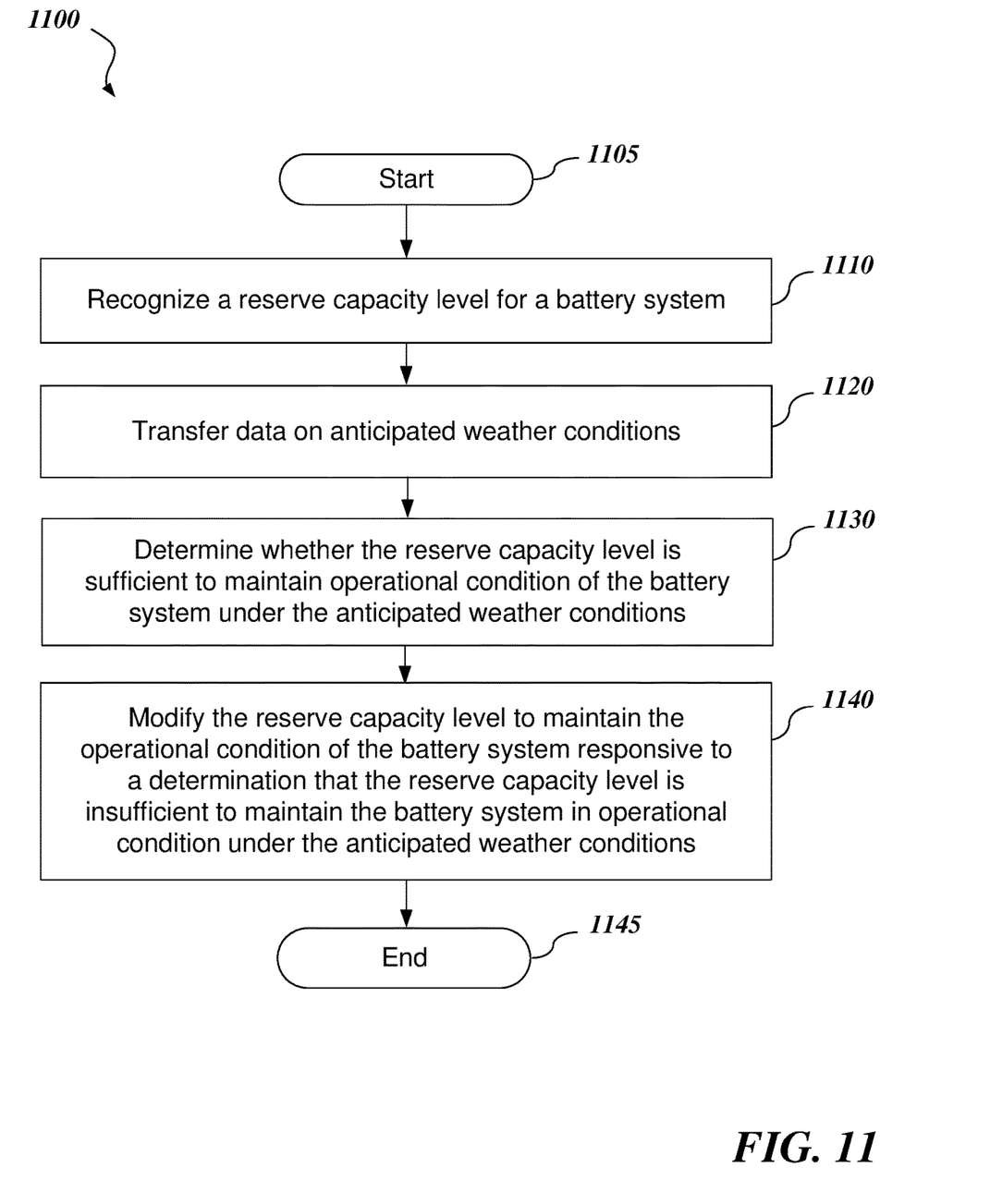
FIGS. 11 and 12 are flow charts of illustrative methods for preserving the operational condition of the battery system.

Referring additionally to FIG. 11, an illustrative method 1100 is provided for maintaining an operational condition of a vehicle battery system and to prevent the battery system from incurring damage as a result of weather conditions. The method begins at a block 1105. At a block 1110, a reserve capacity level for a battery system is recognized. At a block 1120, data on anticipated weather conditions is transferred. At a block 1130, it is determined whether the reserve capacity level is suitable to maintain operational condition of the battery system under the anticipated weather conditions. At a block 1140, the reserve capacity level is modified to maintain the operational condition of the battery system responsive to a determination that the reserve capacity level is potentially insufficient to maintain the battery system in operational condition under the anticipated weather conditions.

Figure 12:
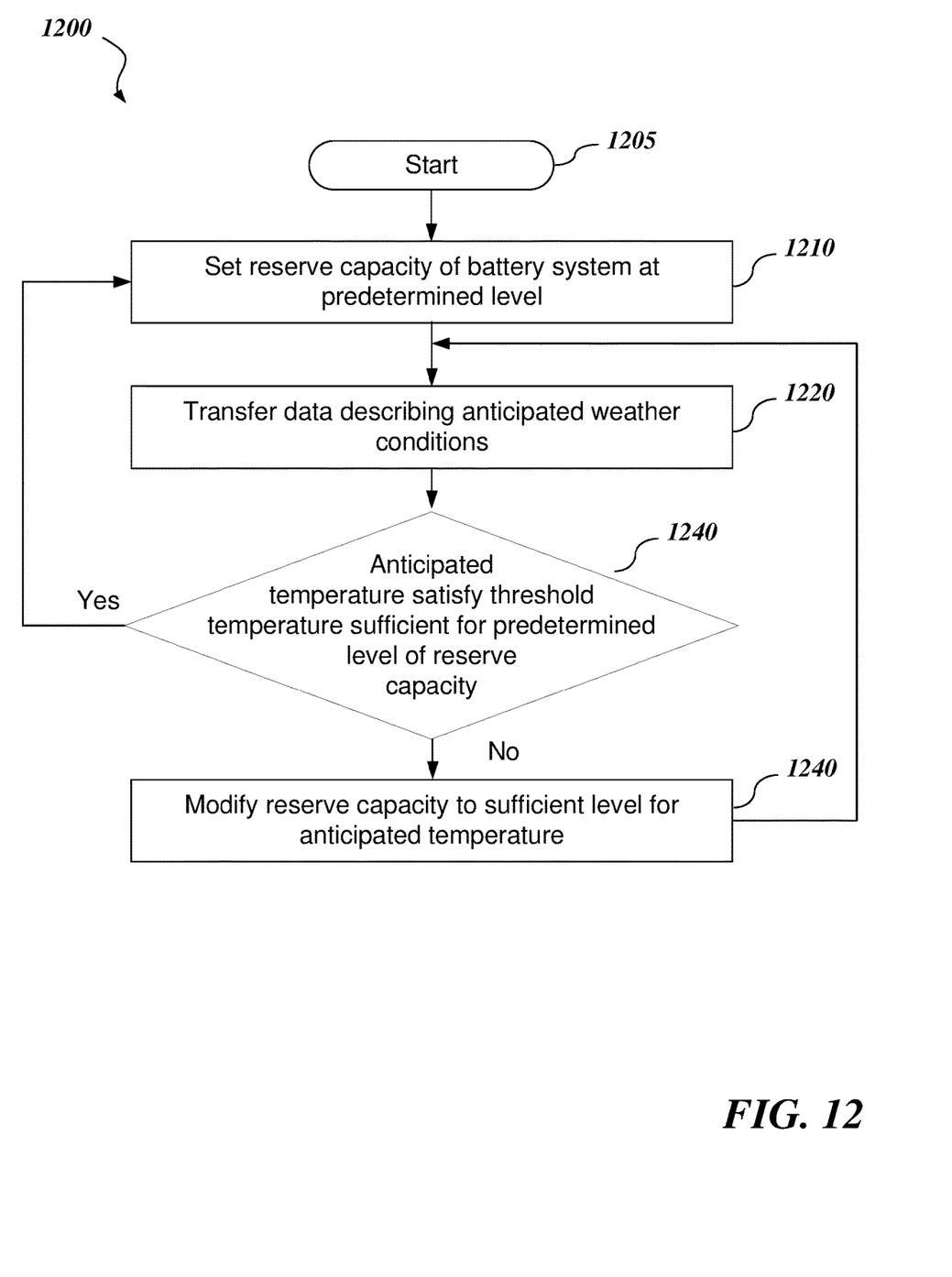

Referring additionally to FIG. 12, another illustrative method 1200 is provided for maintaining an operational condition of a vehicle battery system and to prevent the battery system from incurring damage as a result of weather conditions. The method begins at a block 1205. At a block 1210, a reserve capacity level of a battery system is set to a predetermined level. At a block 1220, data describing anticipated weather conditions is transferred. At a block 1230, it is determined whether an anticipated temperature satisfies a threshold temperature suitable for the predetermined level of reserve capacity. If the anticipated temperature is determined to meet the threshold temperature, the method 1200 reverts to the block 1210. If the anticipated temperature does not meet the temperature threshold, at a block 1240, the reserve capacity is modified to a suitable level for the anticipated temperature, and the method 1200 reverts to the block 1220 to continue to receive data describing anticipated weather conditions.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term module, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of module (e.g., at a first time), as a second type of module (e.g., at a second time, which may in some instances coincide with, overlap, or follow a first time), and/or as a third type of module (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first module that has a first purpose, then a second module that has a second purpose and then, a third module that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different modules in as little as a few nanoseconds. A component may reconfigure on-the-fly, e.g., the reconfiguration of a component from a first module into a second module may occur just as the second module is needed. A component may reconfigure in stages, e.g., portions of a first module that are no longer needed may reconfigure into the second module even before the first module has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a module for displaying graphics on a screen, a module for writing data to a storage medium, a module for receiving user input, and a module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple modules, the example includes the possibility that the same hardware may implement more than one of the recited modules, either contemporaneously or at discrete times or timings. The implementation of multiple modules, whether using more components, fewer components, or the same number of components as the number of modules, is merely an implementation choice and does not generally affect the operation of the modules themselves. Accordingly, it should be understood that any recitation of multiple discrete modules in this disclosure includes implementations of those modules as any number of underlying components, including, but not limited to, a single component that reconfigures itself over time to carry out the functions of multiple modules, and/or multiple components that similarly reconfigure, and/or special purpose reconfigurable components.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C"

would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

It will be appreciated that the detailed description set forth above is merely illustrative in nature and variations that do not depart from the gist and/or spirit of the claimed subject matter are intended to be within the scope of the claims. Such variations are not to be regarded as a departure from the spirit and scope of the claimed subject matter.

What is claimed is:

1. A system comprising:
    a communications interface configured to communicate with a weather information source over a network to transfer data on anticipated weather conditions; and
    a battery controller configured to interoperate with the communications interface and to control a reserve capacity level for a battery system, wherein the battery controller is configured to:
    determine that the reserve capacity level is insufficient to maintain operational condition of the battery system under the anticipated weather conditions, wherein the reserve capacity level is determined to be insufficient to maintain the operational condition of the battery system when the reserve capacity level allows the battery system to incur damage that reduces the capacity of the battery system to receive and maintain a charge due to being stored under the anticipated weather conditions; and
    based on the determination, modify the reserve capacity level to a modified reserve capacity level, wherein the modified reserve capacity level is sufficient to maintain the operational condition of the battery system because the reserve capacity level prevents the battery system from incurring damage that reduces the capacity of the battery system to receive and maintain a charge due to being stored under the anticipated weather conditions.

2. The system of claim 1, wherein the reserve capacity level is chosen from a predetermined reserve capacity level or an operator-specified reserve capacity level.

3. The system of claim 2, wherein the battery controller is configured to receive the operator-specified reserve capacity level via a user interface.

4. The system of claim 3, wherein the user interface includes at least one device chosen from a computing device, a vehicle control interface, or a control panel of the battery management system.

5. The system of claim 1, wherein:
    the communications interface is configured to transfer data describing the anticipated weather conditions including at least one condition chosen from anticipated temperature, a storm severity indicative of a potential power outage, or a duration of the anticipated weather conditions; and
    the battery controller is configured to modify the reserve capacity level responsive to the at least one condition.

6. The system of claim 1, wherein the battery controller is further configured to provide heating to the battery system by initiating a function chosen from one of activating a thermal system to heat the battery system to a minimum to preserve the operational condition of the battery system or increasing the reserve capacity level to include a heating charge reserve configured to provide a quantity of charge to the thermal system usable to heat the battery system to maintain the operational condition of the battery system.

7. A vehicle comprising:
a battery system configured to provide power to a drive system of the vehicle; and
a battery management system including:
an interface configured to communicate with a weather information source to transfer data on anticipated weather conditions; and
a battery controller configured to communicate with the communications interface and to control a reserve capacity level for a battery system, wherein the battery controller is configured to:
determine that the reserve capacity level is insufficient to maintain operational condition of the battery system under the anticipated weather conditions, wherein the reserve capacity level is determined to be insufficient to maintain the operational condition of the battery system when the reserve capacity level allows the battery system to incur damage that reduces the capacity of the battery system to receive and maintain a charge due to being stored under the anticipated weather conditions; and
based on the determination, modify the reserve capacity level to a modified reserve capacity level, wherein the modified reserve capacity level is sufficient to maintain the operational condition of the battery system because the reserve capacity level prevents the battery system from incurring damage that reduces the capacity of the battery system to receive and maintain a charge due to being stored under the anticipated weather conditions.

8. The vehicle of claim 7, wherein the reserve capacity level is chosen from a predetermined reserve capacity level or an operator-specified reserve capacity level.

9. The vehicle of claim 8, wherein the battery controller is configured to receive the operator-specified reserve capacity level via a user interface.

10. The vehicle of claim 9, wherein the user interface includes at least one device chosen from a computing device, a vehicle control interface, or a control panel of the battery management system.

11. The vehicle of claim 7, wherein:
the communications interface is configured to transfer data describing the anticipated weather conditions including at least one condition chosen from anticipated temperature, a storm severity indicative of a potential power outage, or a duration of the anticipated weather conditions; and
the battery controller is configured to modify the reserve capacity level responsive to the at least one condition.

12. The vehicle of claim 7, wherein the battery controller is further configured to provide for heating the battery system by initiating a function chosen from one of activating a thermal system to heat the battery system to a minimum to preserve the operational condition of the battery system or increasing the reserve capacity level to include a heating charge reserve configured to provide a quantity of charge to the thermal system usable to heat the battery system to maintain the operational condition of the battery system.

13. A computer-implemented method comprising:
recognizing a reserve capacity level for a battery system;
transferring data on anticipated weather conditions;
determining that the reserve capacity level is insufficient to maintain operational condition of the battery system under the anticipated weather conditions, wherein the reserve capacity level is determined to be insufficient to maintain the operational condition of the battery system when the reserve capacity level allows the battery system to incur damage that reduces the capacity of the battery system to receive and maintain a charge due to being stored under the anticipated weather conditions; and
based on the determination, modifying the reserve capacity level to a modified reserve capacity level, wherein the modified reserve capacity level is sufficient to maintain the operational condition of the battery system because the reserve capacity level prevents the battery system from incurring damage that reduces the capacity of the battery system to receive and maintain a charge due to being stored under the anticipated weather conditions.

14. The computer-implemented method of claim 13, further comprising accessing a weather information source via a network to transfer the anticipated weather conditions.

15. The computer-implemented method of claim 13, wherein the reserve capacity level is chosen from a predetermined reserve capacity level or an operator-specified reserve capacity level.

16. The computer-implemented method of claim 15, further comprising receiving the operator-specified reserve capacity level via a user interface.

17. The computer-implemented method of claim 13, further comprising transferring data describing the anticipated weather conditions, wherein the data includes at least one condition chosen from anticipated temperature, a storm severity indicative of a potential power outage, or a duration of the anticipated weather conditions.

18. The computer-implemented method of claim 17, further comprising modifying the reserve capacity level responsive to the at least one condition.

19. The computer-implemented method of claim 13, further comprising initiating a function chosen from one of activating a thermal system to heat the battery system to a minimum to preserve the operational condition of the battery system or increasing the reserve capacity level to include a heating charge reserve configured to provide a quantity of charge to the thermal system usable to heat the battery system to maintain the operational condition of the battery system.

* * * * *